United States Patent
Hasek, IV

(10) Patent No.: US 11,050,606 B2
(45) Date of Patent: Jun. 29, 2021

(54) AUTOMATICALLY UPDATING SUBSCRIBER INFORMATION IN A CONTENT DELIVERY NETWORK

(71) Applicant: Layer3 TV, Inc., Denver, CO (US)

(72) Inventor: Charles A. Hasek, IV, Denver, CO (US)

(73) Assignee: T-MOBILE USA, INC., Bellevue, WA (US)

(*) Notice: Subject to any disclaimer, the term of this patent is extended or adjusted under 35 U.S.C. 154(b) by 92 days.

(21) Appl. No.: 15/670,924

(22) Filed: Aug. 7, 2017

(65) Prior Publication Data

US 2018/0041374 A1 Feb. 8, 2018

Related U.S. Application Data

(60) Provisional application No. 62/372,085, filed on Aug. 8, 2016.

(51) Int. Cl.
*H04L 29/06* (2006.01)
*H04W 8/20* (2009.01)
*G06Q 30/00* (2012.01)

(52) U.S. Cl.
CPC .. *H04L 29/06829* (2013.01); *H04L 29/06244* (2013.01); *H04L 63/0281* (2013.01); *H04L 63/101* (2013.01); *H04L 65/4084* (2013.01); *H04L 65/608* (2013.01); *H04L 65/80* (2013.01); *H04W 8/20* (2013.01); *G06Q 30/00* (2013.01)

(58) Field of Classification Search
None
See application file for complete search history.

(56) References Cited

U.S. PATENT DOCUMENTS

| | | | | |
|---|---|---|---|---|
| 9,930,011 | B1* | 3/2018 | Clemons, Jr. | H04L 63/1408 |
| 2008/0080521 | A1* | 4/2008 | Sichner | H04L 61/2038 370/400 |
| 2011/0219229 | A1* | 9/2011 | Cholas | H04L 9/32 713/168 |
| 2011/0249658 | A1* | 10/2011 | Wohlert | H04W 4/04 370/338 |
| 2012/0099589 | A1* | 4/2012 | Kato | G06F 21/10 370/389 |
| 2012/0117571 | A1* | 5/2012 | Davis | H04L 41/0806 718/105 |
| 2012/0133731 | A1* | 5/2012 | Lin | H04N 13/194 348/42 |
| 2015/0207699 | A1* | 7/2015 | Fargano | H04L 63/10 726/4 |

(Continued)

*Primary Examiner* — Chris Parry
*Assistant Examiner* — Chouat Abderrahmen
(74) *Attorney, Agent, or Firm* — Brownstein Hyatt Farber Schreck, LLP

(57) ABSTRACT

Disclosed herein is content delivery system that delivers content to one or more remote devices. In some cases, the content that is provided by the content delivery system is protected content. As such, prior to accessing the content, the one or more remote devices may need to register or otherwise be associated with the content delivery system. The content delivery system utilizes a first communication path to allow the one or more remote devices to register with the content delivery system and/or verify that it is authorized to access the content. The content delivery system also utilizes a second communication path to deliver the content to the authorized remote devices.

20 Claims, 10 Drawing Sheets

(56) References Cited

U.S. PATENT DOCUMENTS

2016/0241563 A1* 8/2016 Barkie ................ H04L 41/0813
2016/0330245 A1* 11/2016 Bell .................... H04L 63/1433
2017/0290074 A1* 10/2017 Lee ....................... H04W 76/11

* cited by examiner

AUTOMATICALLY UPDATING SUBSCRIBER INFORMATION IN A CONTENT DELIVERY NETWORK

CROSS-REFERENCE TO RELATED APPLICATION(S)

This application is a nonprovisional patent application of and claims the benefit of U.S. Provisional Patent Application No. 62/372,085, filed Aug. 8, 2016 and titled "Automatically Updating Subscriber Information in a Content Delivery Network," the disclosure of which is hereby incorporated herein by reference in its entirety.

FIELD

The described embodiments relate generally to a content delivery network. More specifically, the described embodiments are directed to automatically updating an access control list that contains information about various remote devices that can access protected content hosted, or otherwise provided by, the content delivery network.

BACKGROUND

Many networks utilize access control lists to determine which users or devices can access objects or content on the network. Typically, these access control lists are manually updated. For example, when a new user or device is to be granted access to a secure portion of the network, or is to be granted access to the secured object, an administrator of the network, or some other individual who has access to the access control list, manually updates the access control list. Once updated, the new user or device may access the secured data. However, manually updating access control lists is a time consuming process. In addition, manual entry of such information may introduce errors which may cause the access control list to be inaccurate and ineffective.

SUMMARY

Disclosed herein is content delivery system that delivers content to one or more remote devices. In some cases, the content that is provided by the content delivery system is protected content. As such, prior to accessing the content the one or more remote devices may need to register or otherwise be associated with the content delivery system. In some embodiments, the content delivery system utilizes a first communication path to allow the one or more remote devices to register with the content delivery system and/or verify that it is authorized to access the content. The content delivery system also utilizes a second communication path to deliver the content to the authorized remote devices.

In some instances, the content delivery system utilizes an access control list to determine or verify which remote devices can access the protected content. The content delivery system may dynamically and automatically update the access control list when a determination is made that a particular remote device should be granted access to the content and/or when a determination is made that a particular remote device should no longer be granted access to the content.

Accordingly, described herein is a method for delivering content to a remote device. The method includes receiving, over a first communication path, information corresponding to the remote device and comparing the received information to a set of known subscriber information. When the received information corresponds to at least one of the set of known subscriber information, content may be delivered to the remote device over a second communication path. When the received information does not correspond to at least one of the set of known subscriber information a determination is made as to whether the received information should be added to the set of known subscriber information. When it is determined that the received information should be added to the set of known subscriber information, the set of known subscriber information is automatically updated with the received information and content is delivered to the remote device over the second communication path.

Also described is a system for providing content to a remote device. The system includes a provisioning module configured to receive information from a remote device over a first communication channel, determine whether to add the received information to an access control list, and automatically add the received information to the access control list. The system also includes a gateway that utilizes the access control list to permit the remote device to access content over a second communication channel while the received information is included in the access control list.

The instant application also describes a computer-readable storage medium encoding computer executable instructions which, when executed by a processor, performs a method for automatically updating an access control list associated with a content delivery network. This method includes receiving, over a first communication path, information from a remote device and determining whether the information corresponds to a set of known subscriber information. When the information corresponds to a set of known subscriber information, an access control list is automatically updated to include the information. Once updated, the remote device may receive content over a second communication channel.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
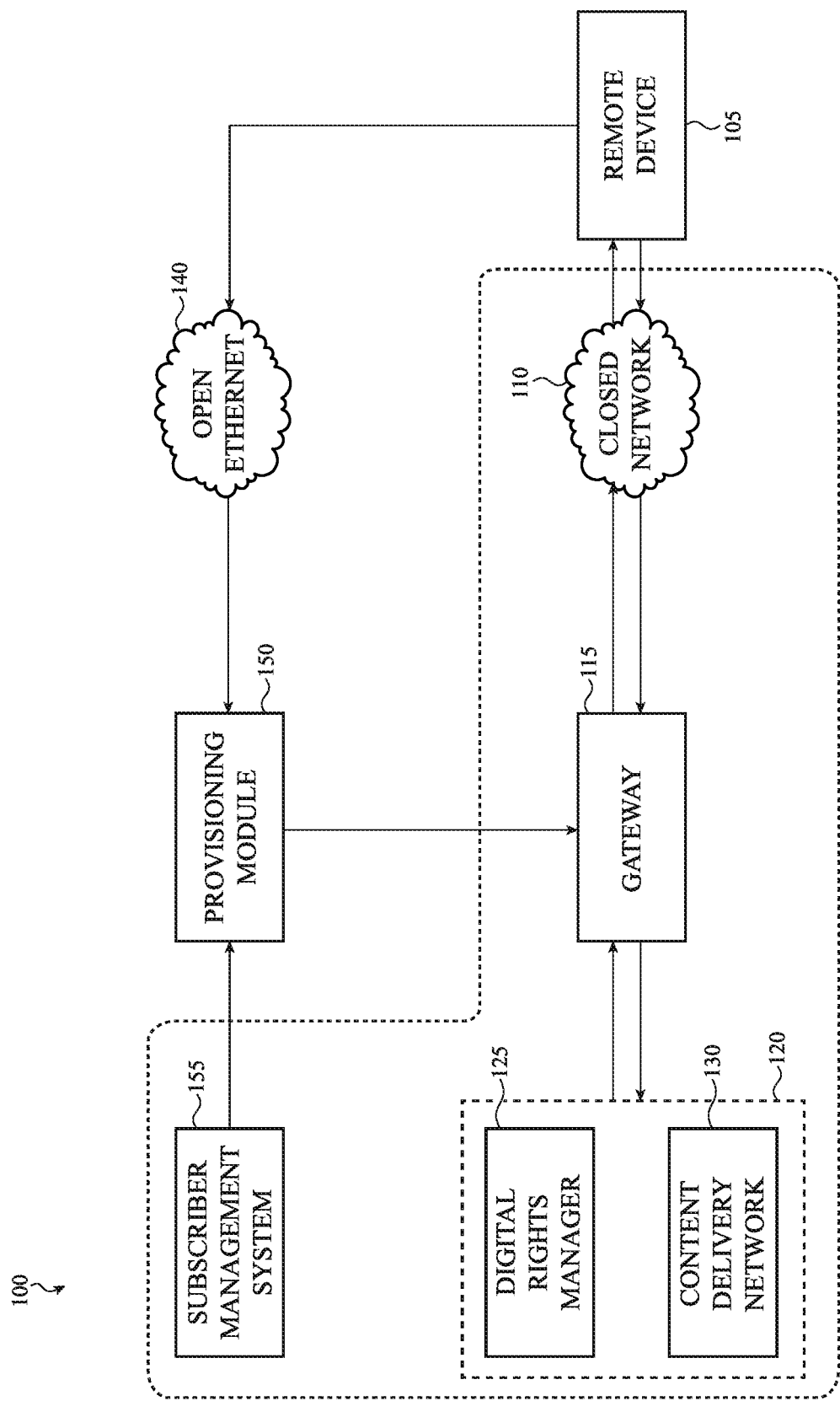
FIG. 1A illustrates an example content delivery system according to one or more embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure is directed to a content delivery system that delivers content to one or more remote devices. The content may be audio-visual content, audio content, secure and unsecure documents, photographs, digital books and so on. In some embodiments, the content may be cable television content, movies or other such content.

The remote devices may be any device capable of receiving the content over a network, cable or Ethernet connection and so on. In some embodiments, the content delivery system is a subscription based content delivery system that delivers content to one or more subscribers. In such instances, the remote device may be provided by the content provider. For example, the remote device may be a set-top box.

In order to ensure that the content is only delivered to authorized remote devices, the content delivery system may utilize an access control list. The access control list may be stored and maintained by the content delivery system. However, unlike conventional access control lists that require a user or administrator to manually update the information, the content delivery system described herein includes a provisioning module that automatically updates the access control list. In some embodiments, the access control list may be updated periodically. In other implementations, the access control list may be updated when a new subscriber joins the content delivery system or otherwise attempts to access the content hosted or provided by the content delivery system.

As will be explained in detail below, the provisioning module of the content delivery system receives information from the remote device that is seeking to access content. The provisioning module parses the received information and compares it to information about known subscribers that have access, or should have access, to the system. If the provisioning module determines that the received information corresponds to the known subscriber information, the remote device is granted access to the content.

In some cases, the provisioning module may determine that the information received from the remote device does not correspond to any information contained in the known subscriber information, but that it should be added. In such instances, the provisioning module may automatically add the received information to the known subscriber information.

In so doing, the provisioning module may also automatically update an access control list that is associated with the content delivery system. In some embodiments, the access control list includes a list of all internet protocol (IP) addresses that correspond to remote devices that have access to content hosted or otherwise provided by the content delivery system.

When the provisioning module updates the access control list, the updated list may be provided to a gateway that controls access to the content in the content delivery system. Once the gateway receives the updated list, the remote device that originally sent the information to the provisioning module may access the hosted content.

As will be described in detail below, the content delivery system utilizes at least two different communication channels—one channel for authorizing the remote device and one channel for delivering content to the remote device. For example, the provisioning module receives the information from the remote device over a first communication channel. Once the information is verified in the manner described above, content may be delivered to the remote device over a second communication channel that is different from the first communication channel. In some embodiments, the first communication channel is an open network or an open Ethernet and the second communication channel is a closed or secure network.

For example, any traffic on the second communication channel must pass through a gateway of the content delivery system. As used herein, the term "gateway" means a router and/or a firewall that prevents a remote device from unauthorized access to a secure area of the network.

These and other embodiments are discussed in more detail below with reference to FIGS. 1A-5. However, those skilled in the art will readily appreciate that the detailed description given herein with respect to these Figures is for explanatory purposes only and should not be construed as limiting.

FIG. 1A illustrates an example content delivery system 100 according to one or more embodiments of the present disclosure. The content delivery system 100 may be used to deliver content to a remote device 105. The remote device 105 may be any computing device capable of connecting to, and receiving content over, an internet or network connection. The remote device 105 may be a laptop computing device, a desktop computing device, a tablet computing device, an internet-ready television and so on.

In some implementations, the content delivery system 100 may be part of, or otherwise associated with, a subscription based service in which content is provided to subscribers of the system. For example, the content delivery system 100 may be utilized by a cable or satellite television provider, an internet television content provider, a web-based content provider or service or any other service that provides content over a cable network, the internet and so on. In such implementations, the remote device 105 may be a set-top box that may be registered with the content delivery system 100. Although a set-top box is specifically mentioned, one is not required. Further, although one remote device 105 is shown, the content delivery system 100 may include any number of remote devices.

The content delivery system 100 may include a content delivery network 130. The content delivery network 130 may deliver various types of content such as, but not limited to, movies, television shows, music, pictures, books, documents, or other such content to the remote device 105. In some embodiments, the content delivery network 130 is in communication with a digital rights manager 125 that may further restrict access to the content hosted or otherwise provided by the content delivery network 130. For example, although a remote device 105 may have access to content provided by the content delivery network 130, the digital rights manager 125 may allow the remote device 105 to access certain types of content while restriction access to other types of content.

In some embodiments, the digital rights manager 125 and the content delivery network 130 may be in protected or secured area (indicated by the dashed square 120). Restricting access to the content delivery network 130 and the digital rights manager 125 helps protect the content delivery network 130 and the digital rights manager 125 from malicious attacks (e.g., denial of service attacks).

In addition, restricting access to the content delivery network 130 and the digital rights manager 125 may prevent unauthorized access to the content that is provided by the content delivery network 130. For example, the content delivery system 100 helps ensure that the content provided by the content delivery network 130 is only accessible to authorized devices and/or individuals (e.g., subscribers paying for access to the content). Restricting access to these components may also limit the amount of traffic on various communications channels through which the content is provided to the remote device 105. As such, subscribers to the content delivery system 100 may experience a higher quality of service across the system 100.

Although the content delivery network 130 and the digital rights manager 125 are shown as being protected, additional modules or components in the content delivery system 100 may also be protected or otherwise have restricted access. These modules and components may include a customer information module that includes contact and/or payment information about subscribers to the content delivery system 100 or other sensitive information.

The content delivery system 100 may also include a gateway 115. The gateway 115 may be used to permit and/or restrict access to the content provided or hosted by the content delivery network 130. The gateway 115 may be a firewall and/or a router that utilizes an access control list to determine which remote devices 105 are authorized to access the content provided by the content delivery network 130. For example, the access control list may include a list of public IP addresses. Each public IP address may be associated with a particular remote device 105 that is authorized to request and/or receive the hosted content. If a remote device 105 requests content, the gateway 115 checks the IP address of the remote device 105 and if it matches an IP address contained on the access control list, the request from the remote device 105 passes through.

As shown in FIG. 1A, the remote device 105 may access the gateway 115 though a closed network 110. The closed network 110 is a network that only a particular set of users and/or devices has access to. In some cases, access to the closed network 110 may only be provided to paid subscribers of the content delivery system 100 and/or to remote devices 105 that have registered with the content delivery system 100.

Because access to the gateway 115, and ultimately the content delivery network 130, is through the closed network 110, any remote device 105 that is not registered with the content delivery system 100 may not have access to any of the content. For example, and as will be described below with respect to FIG. 1F, if an unauthorized device seeks access to content provided by the content delivery network 130, the gateway 115 may prevent or otherwise block the unauthorized device from accessing the content. In some embodiments, this includes blocking the IP address (or a range of IP addresses) associated with the unauthorized device.

However, in order to ensure that a remote device 105 may be authorized and ultimately have access to the content provide by the content delivery network 130, the content delivery system 100 of the present disclosure provides an alternative communication channel through which a remote device 105 may register with the content delivery system 100. The alternative communication channel may be an open network or an open Ethernet 140. Unlike the closed network 110, the open Ethernet 140 may allow any remote device 105 to access information from or provide information to a second device, object, or entity.

Figure 1B:
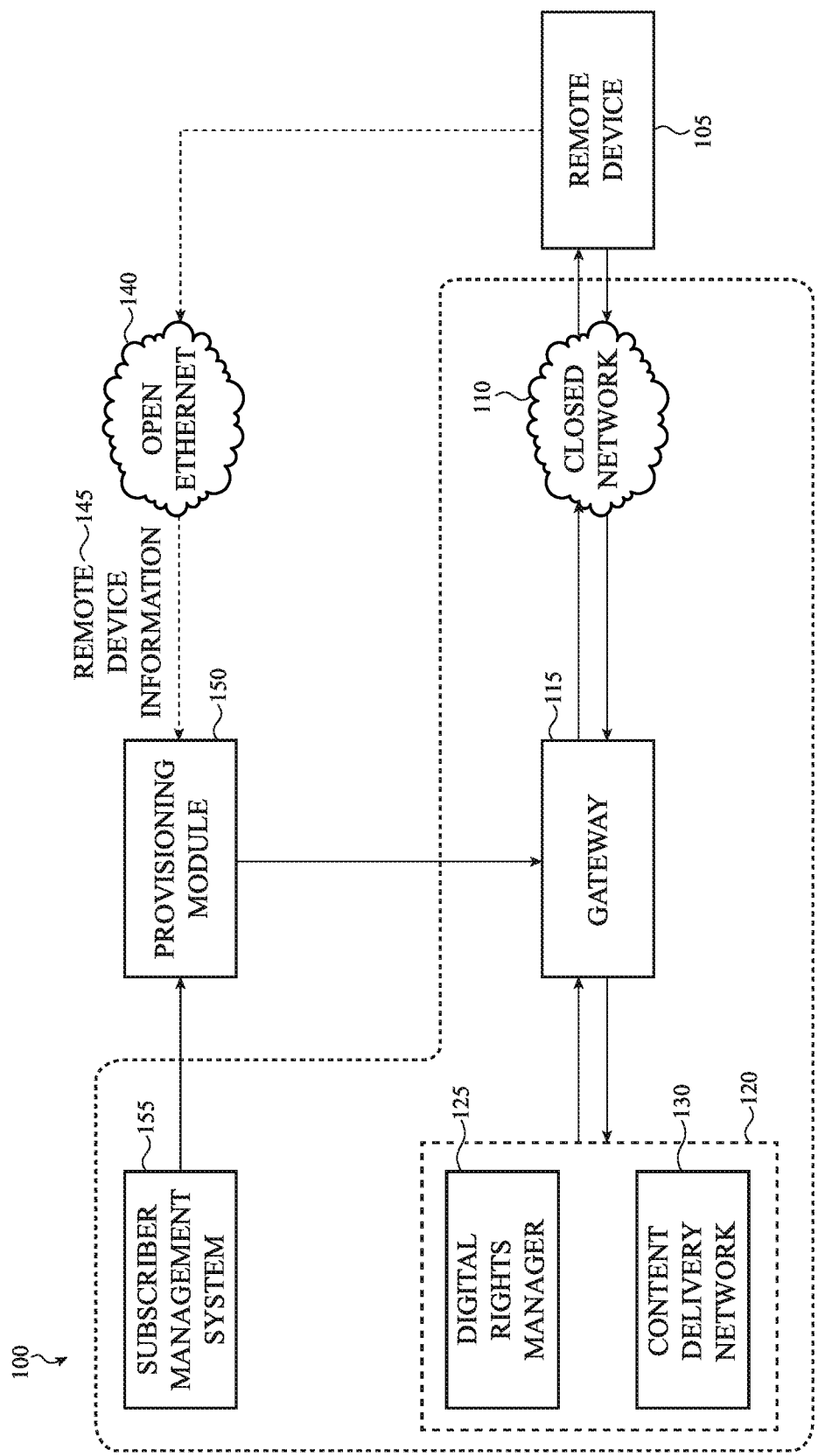
FIG. 1B illustrates the example content delivery system of FIG. 1A in which a remote device sends information to a provisioning module according to one or more embodiments.

For example, and turning to FIG. 1B, the remote device 105 may use the open Ethernet 140 to provide remote device information 145 to a provisioning module 150. The provisioning module 150 is configured to determine, based on the remote device information 145, whether the remote device 105 should have access to the content hosted by the content delivery network 130. If so, the provisioning module 150 uses the remote device information 145 to register the remote device 105 with the content delivery system 100.

Figure 2:
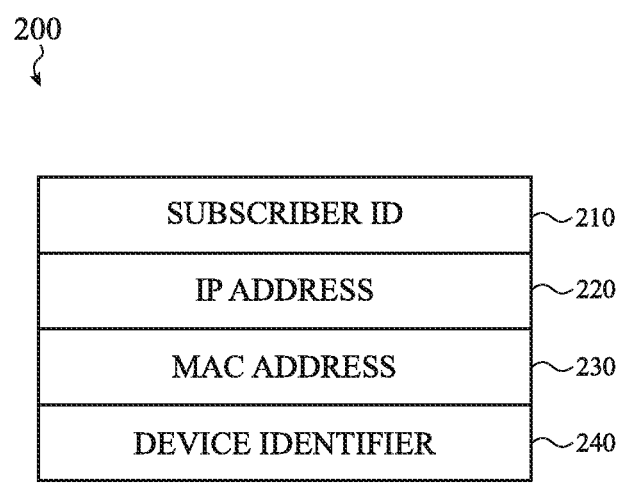
FIG. 2 illustrates an example set of information that may be sent by a remote device to a provisioning module in a content delivery system according to one or more embodiments.

In some embodiments, the remote device information 145 includes unique information about the remote device 105. Turning briefly to FIG. 2 (which illustrates example remote device information 200), the information may include a subscriber identification number 210, an IP address 220 that is associated with the remote device, such as, for example, remote device 105, a media access control (MAC) address associated with the remote device and a device identifier 240. In some embodiments, the subscriber ID 210 identifies a user of the remote device, the IP address 220 identifies a network, a service provider and/or a location of the remote device, the MAC address 230 identifies the remote device itself. For example, the MAC address 230 may specify that the remote device 105 is a set-top box provided by the subscription service. As discussed above, the remote device information 200 may also include a device identifier 240. The device identifier 240 may provide additional information about the device. For example, the device identifier 240 may include information from the manufacturer and/or the provider of the content delivery system 100 and include information such as a model number for the device, a serial number associated with the device and so on.

Although specific information is shown in FIG. 2 and described above, the remote device information 145 may include additional information or less information.

In some embodiments, this information may be initially provided to the provisioning module 150 during a set-up process. For example, if the content delivery system 100 is a subscription based service, this information may be provided to the provisioning module 150 when the remote device 105 (such as a set-top box) is installed at a user location. This information may then be stored by a subscriber management system 155. When the remote device 105 subsequently seeks to access content, the provisioning module 150 may add the information to an access control list such as described below.

Regardless of when the remote device information 145 is received (e.g., during an initial set-up process, during a maintenance process, or when the remote device 105 is seeking to access content), the provisioning module 150 compares this information to known subscriber information contained in the subscriber management system 155. If the remote device information 145 matches the known subscriber information, the remote device 105 may be given access to the content hosted by the content delivery network 130.

If the remote device information 145 does not match the known subscriber information contained in the subscriber management system 155, the provisioning module 150 may make a determination as to whether the received information should be added to the known subscriber information. For example, the provisioning module 150 may determine, using the MAC address 230 and/or the subscriber ID 210 (FIG. 2), that the remote device 105 is a new subscriber to the content delivery system 100. As such, the remote device 105 should have access to the content hosted by the content delivery network 130.

Figure 1C:
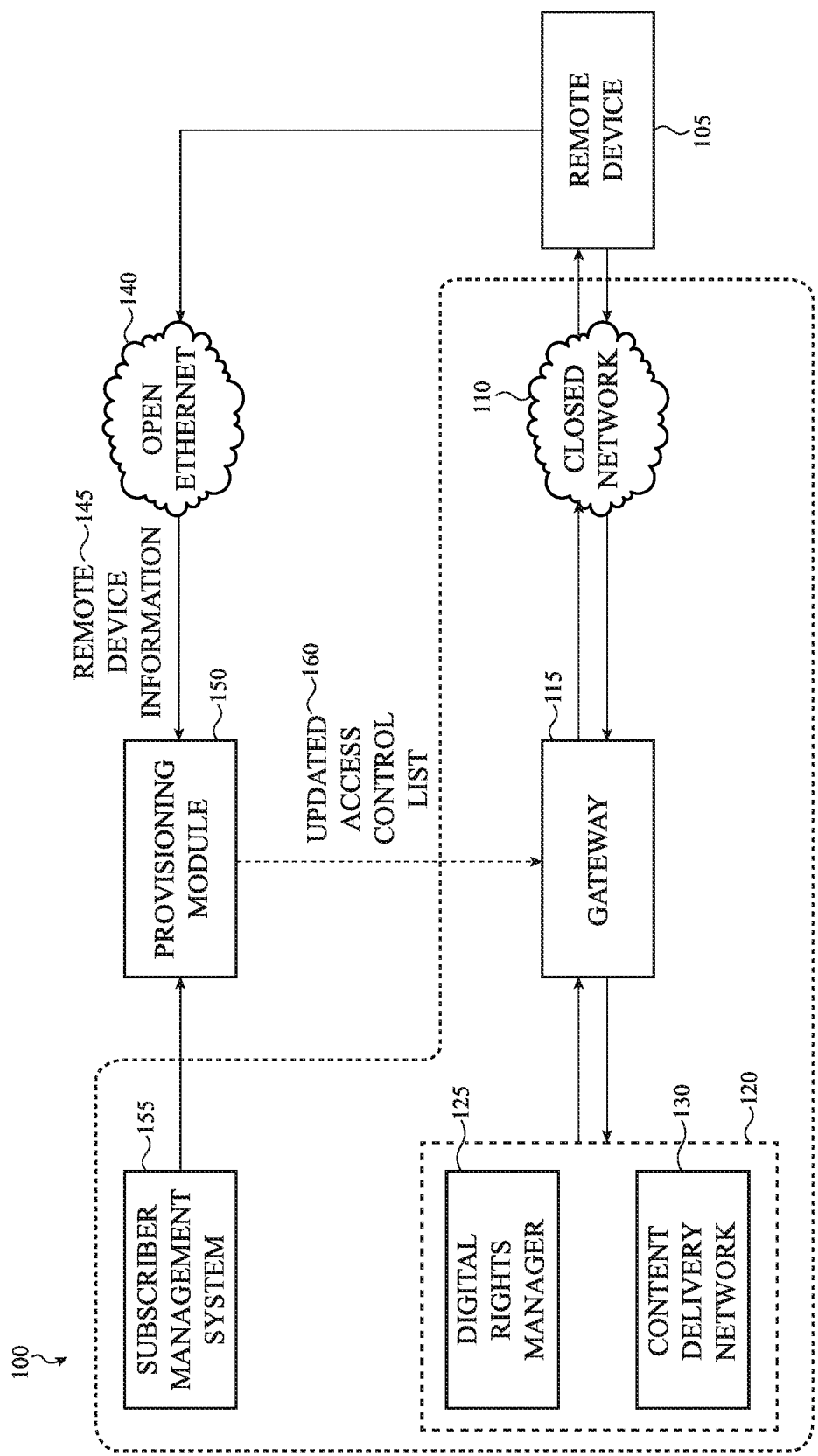
FIG. 1C illustrates the example content delivery system of FIG. 1A in which the provisioning module sends an updated access control list to a gateway according to one or more embodiments.

In such instances, the provisioning module 150 may automatically add the IP address (or other information contained in the remote device information 145) to an access control list. The updated access control list 160 may then be transmitted or otherwise communicated to the gateway 115 such as shown in FIG. 1C. In some embodiments, the provisioning module 150 may also add the information contained in the remote device information 145 to the known subscriber information contained in the subscriber management system 155. As such, the provisioning module 150 can periodically check which devices in the system continue to have access to the content.

In some embodiments, the provisioning module 150 may add a range of IP addresses to the access control list. Each IP address or range of IP addresses may be associated with a particular location, Internet service provider and so on. Thus, when a range of IP addresses are added, the access control list may need to be updated less frequently.

For example, if a range of IP addresses are added to the access control list in response to a first remote device 105 being added to the content delivery system 100, when a second remote device 105 is added, the second remote device 105 may have an IP address that falls within the range of previously added IP addresses. Accordingly, the provisioning module 150 may not need to update the access control list each time a remote device 105 is added to the content delivery system 100.

Figure 1D:
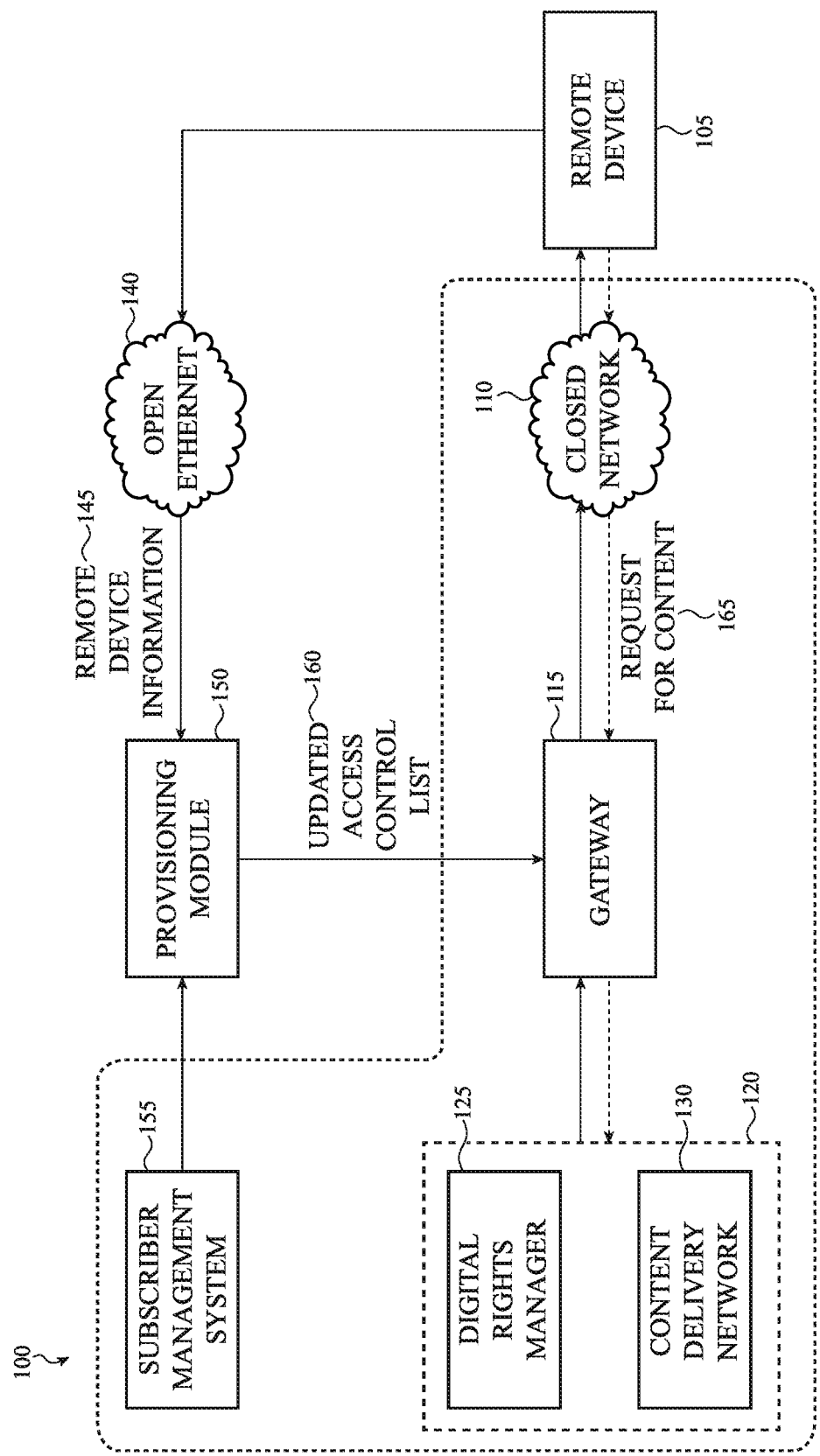
FIG. 1D illustrates the example content delivery system of FIG. 1A in which the remote device requests content from a content delivery network according to one or more embodiments.

Referring to FIG. 1D, once the remote device 105 has been registered by the provisioning module 150 through the open Ethernet 140, the remote device 105 may send a request for content 165 over the closed network 110. When the request for content 165 reaches the gateway 115, the gateway 115 may determine that the IP address (or a range of IP addresses) associated with the remote device 105 is contained in the updated access control list 160. As such, the request for content165 may be received by the content delivery network 130.

Figure 1E:
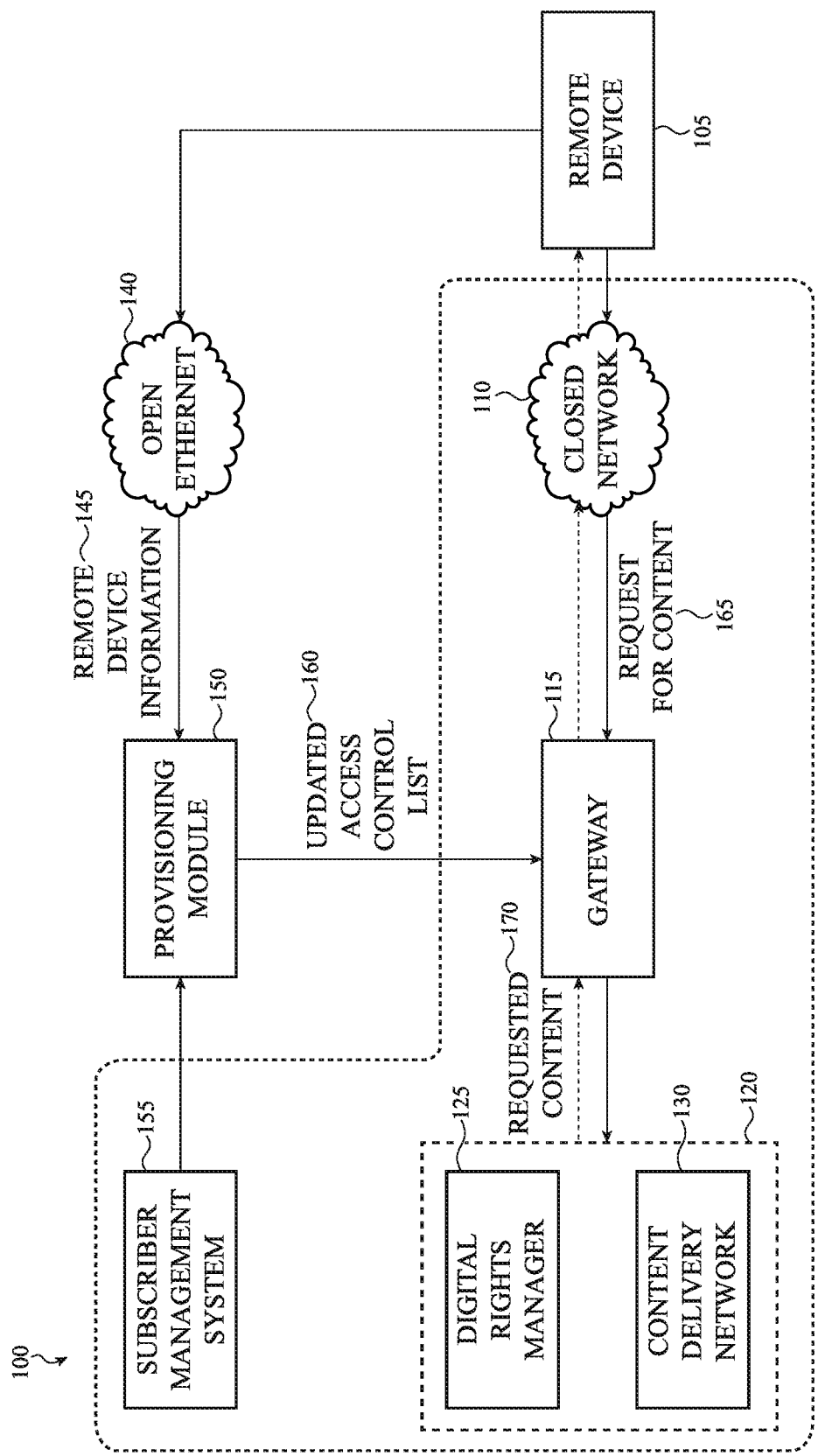
FIG. 1E illustrates the example content delivery system of FIG. 1A in which the content delivery network sends requested content to the remote device according to one or more embodiments.

As shown in FIG. 1E, once the request for content 165 is received, the content delivery network 130 may send the requested content 170 back to the remote device 105 over the closed network 110. In some embodiments, the digital rights manager 125 may also check the request for content 165 to ensure that the remote device 105 is authorized to receive the requested content.

In some embodiments, the gateway 115 may be in communication with the provisioning module 150. For example, and as previously described, the provisioning module 150 may send an updated access control list 160 to the gateway 115. In other embodiments, the provisioning module 150 may send the gateway 115 updated access control list rules and/or updates to an access control list stored by the gateway 115. Once received, the gateway 115 may update the access control list accordingly.

Figure 1F:
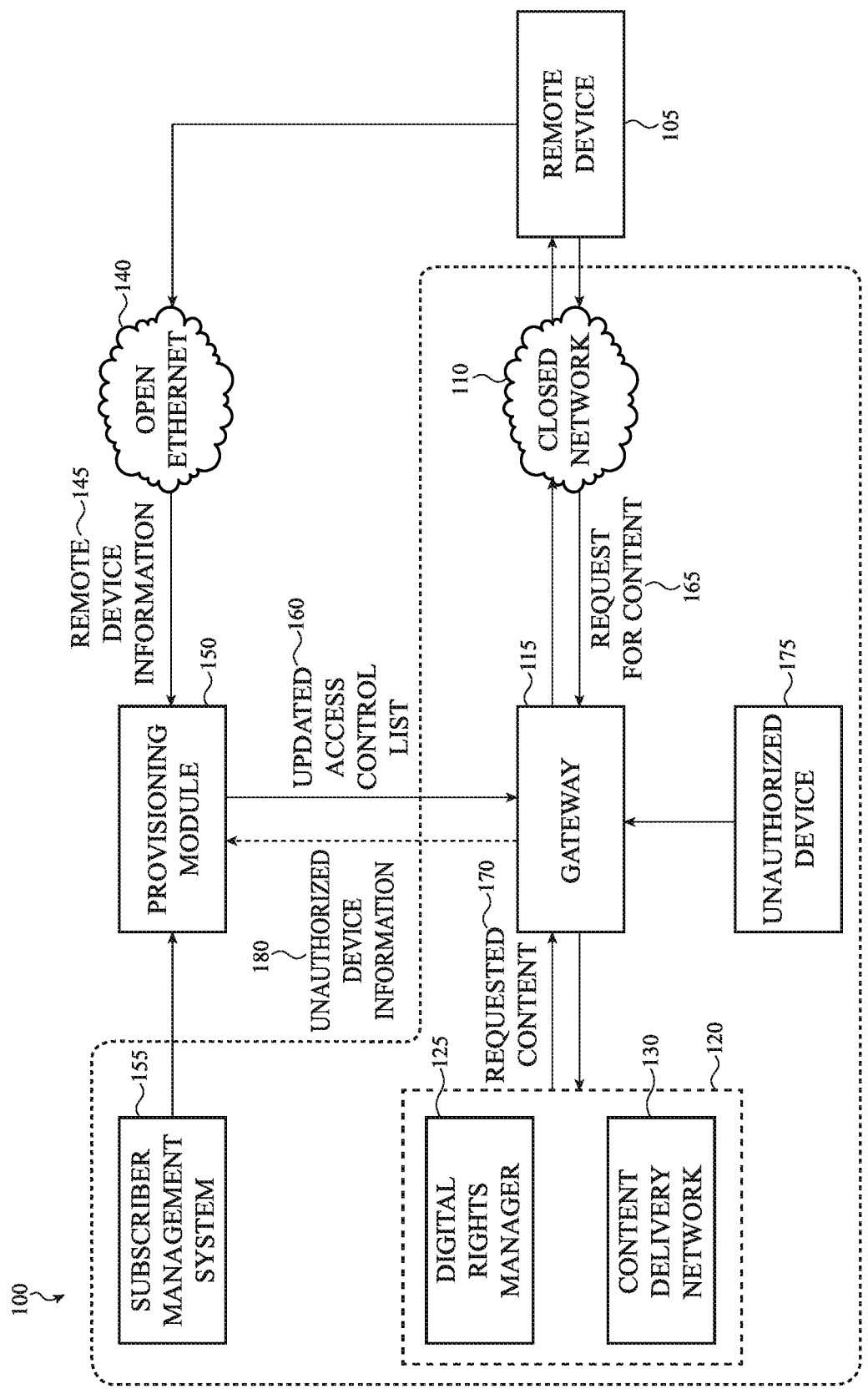
FIG. 1F illustrates the example content delivery system of FIG. 1A in which an unauthorized device tries to access content provided by the content delivery system according to one or more embodiments.

Referring to FIG. 1F, the gateway 115 may also be configured to communicate or otherwise send information to the provisioning module 150. For example, when an unauthorized device 175 tries to access the gateway 115, the gateway 115 may send unauthorized device information 180 to the provisioning module 150. The unauthorized device 175 may be a remote device that spoofs an authorized device, such as remote device 105 or otherwise impersonates an authorized user of the content delivery system 100. In some embodiments, the unauthorized device information 180 may include an IP address, a range of IP addresses, or other information about the unauthorized device 175.

When the provisioning module 150 receives this information, it may compare the unauthorized device information 180 to known subscriber information contained in the subscriber management system 155. If any of the information contained in the unauthorized device information 180 matches the information in the known subscriber information (meaning that the unauthorized device 175 should be authorized to receive content), the provisioning module 150 may update the access control list and provide it to the gateway 115.

For example, the unauthorized device information may include an IP address or range of IP addresses that match or otherwise correspond to IP address information contained in the known subscriber information. As such, the access control list used by the gateway 115 may be updated to enable the unauthorized device 175 to become authorized and ultimately have access to the content hosted by the content delivery network 130.

However, if the information contained in the unauthorized device information 180 does not correspond to or otherwise match the known subscriber information, the provisioning module 150 may instruct the gateway 115 to block any and all requests coming from the unauthorized device 175, its associated IP address and/or range of IP addresses.

Figure 3:
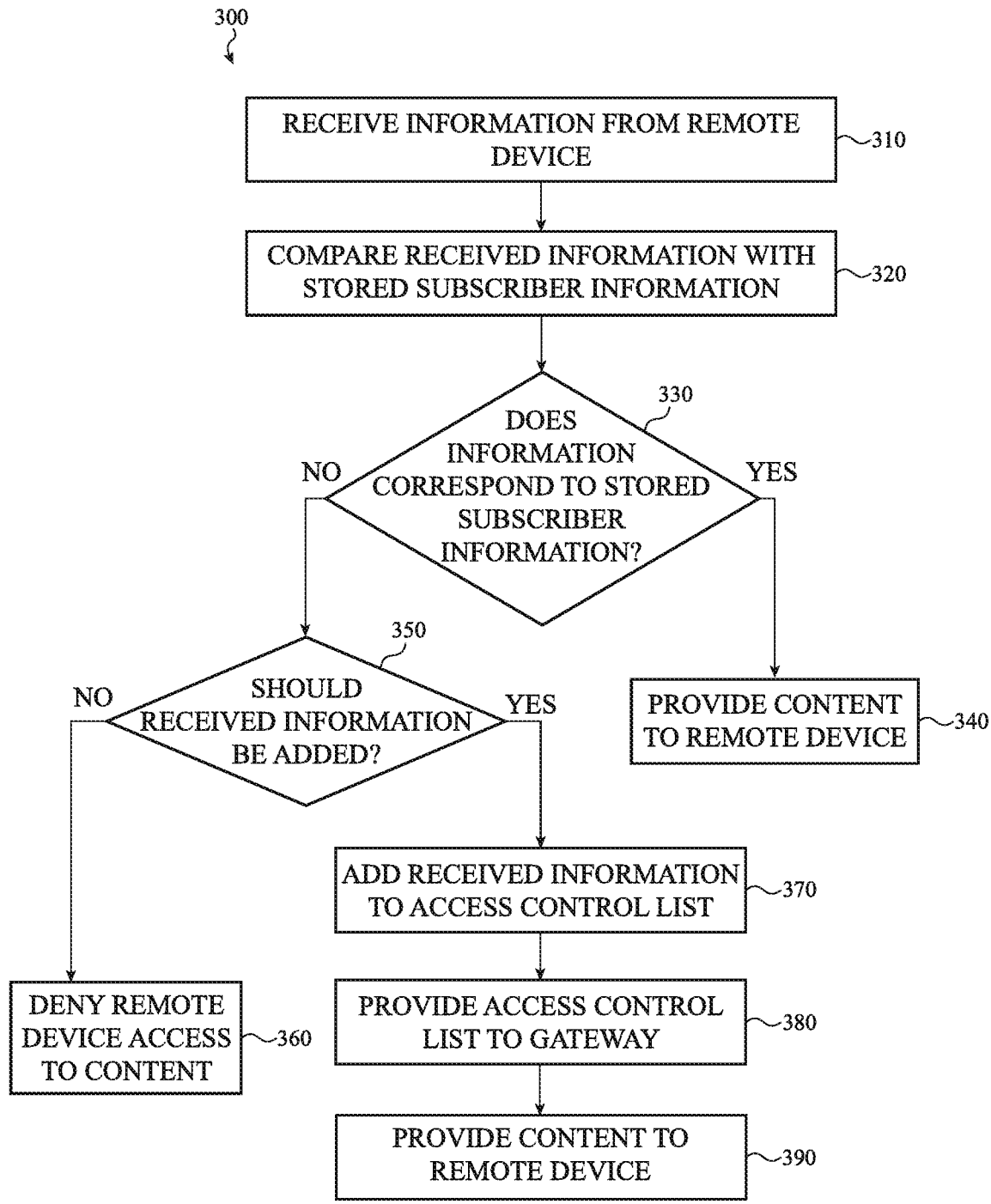
FIG. 3 illustrates a method for automatically updating an access control list that may be used by a content delivery system according to one or more embodiments.

FIG. 3 illustrates a method 300 for automatically updating an access control list that may be utilized to restrict and allow access to content hosted by a content delivery system. In some cases, the method 300 may be used by the content delivery system 100 described above with respect to FIGS. 1A-1F.

For example, the method 300 may be used by a subscription based content provider to ensure that only authorized devices and/or individuals have access to hosted content. It may also be used on a periodic basis to ensure that customer access to the hosted content remains current or when a new subscriber has requested or otherwise signs up for the content delivery service.

Method 300 begins at operation 310 when a component or module of the content delivery system, such as, for example, a provisioning module, receives information from a remote device. In some embodiments, the remote device may be a set-top box issued to a subscriber by a content provider. In other embodiments, the remote device may be any computing device capable of receiving content over a network or internet connection.

The provisioning module may receive this information over a first communication channel. In some embodiments, the first communication channel is an open network or an open Ethernet such as described above.

The information received from the remote device may include an IP address (or a range of IP addresses) used by the remote device, a subscriber ID that identifies that the remote device is associated with a paying customer, and/or a MAC address of the remote device. Although specific information is discussed, the information provided by the remote device and received by the provisioning module may include various other types of information.

Once the information is received, flow proceeds to operation 320 and the received information is compared with stored subscriber information. In some embodiments the stored information may be stored and maintained by a subscriber management system. The stored subscriber information may include information about individuals and/or devices that should have access to content hosted by the content delivery system. This information may include a list of IP addresses (or a range of IP addresses) that have access to the content. The information may also include whether particular users are current on payments that may be required by the content provider. In still yet other embodiments, the information may include MAC addresses of various devices (e.g., set-top boxes) issued by the content provider.

Once the information is compared, flow proceeds to operation 330 and a determination is made as to whether the received information matches the stored information. If the information matches, flow proceeds to operation 340 and content may be provided to the remote device. The content may be provided to the remote device over a second communication channel that is different from the first communication channel. In some embodiments, the second communication channel is a closed or secure network.

If it is determined in operation 330 that the received information does not match the stored information, flow proceeds to operation 350 and a determination is made as to whether the received information should be added to the subscriber information. In some cases, this determination may be made based on whether a new subscriber to the content delivery system is trying to access content for a first time or is undergoing a new set-up process. For example, the user may have received a new set-top box and is undergoing an installation process in which the information corresponding to the set-top box (e.g., IP address, MAC address and so on) is provided to the provisioning module.

If it is determined that the received information should not be added to the stored subscriber information, flow proceeds to operation 360 and the remote device is prevented from accessing content. In some embodiments, the provisioning module may instruct a gateway, such as a firewall or router, to block further requests from that particular remote device.

However, if it is determined in operation 350 that the information received from the remote device should be added to the stored subscriber information, flow proceeds to operation 370 and the information is automatically added to an access control list. In some embodiments, the information may also be added to the stored subscriber information.

Once the access control list has been updated, flow proceeds to operation 380 and the updated access control list is provided to the gateway. As previously described, the gateway may be a router or a firewall that utilizes the access to control list to determine which remote devices may access content hosted or otherwise may available by a content delivery network. Once the access control list has been received from the provisioning module, flow proceeds to operation 390 and content may be provided to the remote device. As described above, the content may be provided to the remote device over a second communication channel, such as, for example, a closed network.

Figure 4:
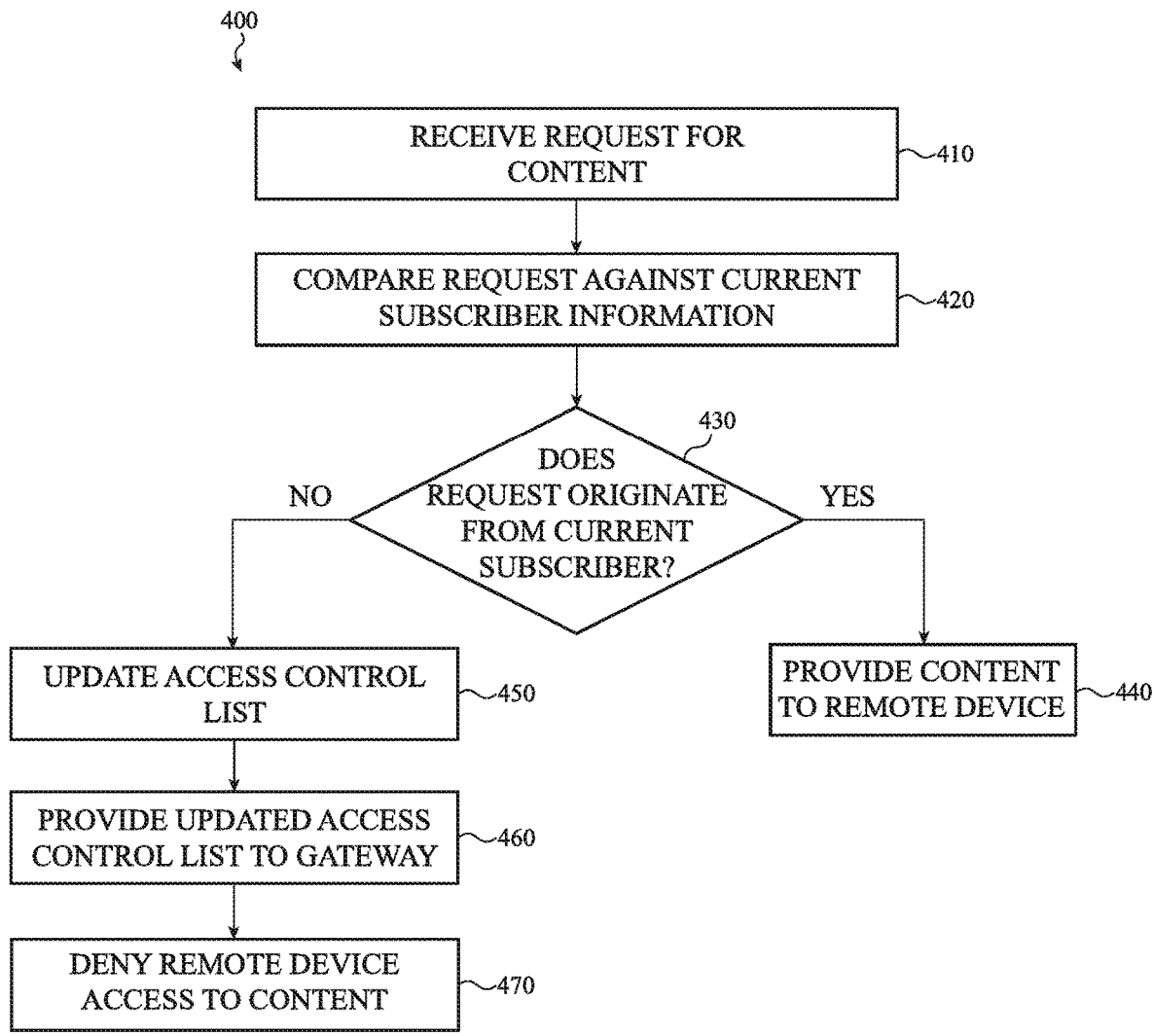
FIG. 4 illustrates another method for automatically updating an access control list that may be used by a content delivery system according to one or more embodiments.

The method 300 described above may be used to add a remote device to the content delivery system or otherwise verify that the remote device should have access to protected content. However, a content delivery system may also need to maintain a current list of devices that continue to be authorized to access the content. For example, if the content delivery system is associated with a subscription service, the content delivery system may need to ensure that an account associated with a particular remote device is current on its subscription fees. In other cases, one or more IP addresses may be reallocated to different devices. As such, those IP addresses should be removed from the access control list. Accordingly, FIG. 4 illustrates a method 400 for automatically updating an access control list that may be used by a content delivery system.

Method 400 begins at operation 410 in which a request for content is received. In some embodiments, the request for content may be sent from a remote device to a gateway over a closed network. The request for content may include information associated with the requesting device. This information may include an IP address (or a range of IP addresses) associated with the remote device, a subscriber ID, a MAC address associated with the remote device and so on.

Once this information is received, it is compared against known subscriber information. The known subscriber information may be stored by a subscriber management system and may include information about paying customers, whether their subscription is up to date and so on. In some embodiments, the gateway may relay the received information to a provisioning module which handles the comparison. In other embodiments, the gateway may instruct the remote device to send the information to the provisioning module directly, such as, for example, over a different communication channel (e.g., an open Ethernet).

Once the information is received by the provisioning module, flow proceeds to operation 430 and a determination is made as to whether the request originates from a current subscriber. If it is determined that the request originated from a known subscriber (e.g., the known subscriber is current on their payments), flow proceeds to operation 440 and content is provided to the remote device. As described above, the content may be provided to the remote device over the closed network.

If it is determined in operation 430 that the request does not originate from a known subscriber (e.g., the subscriber has discontinued service or is not current on payments) flow proceeds to operation 450 and the provisioning module updates the access control list. In some cases, the update to the access control list may be removing an IP address or range of IP addresses associated with the remote device from the access control list.

Once updated, the provisioning module provides 460 the updated access control list to the gateway. The gateway may then deny 470 the remote device access to the content.

Figure 5:
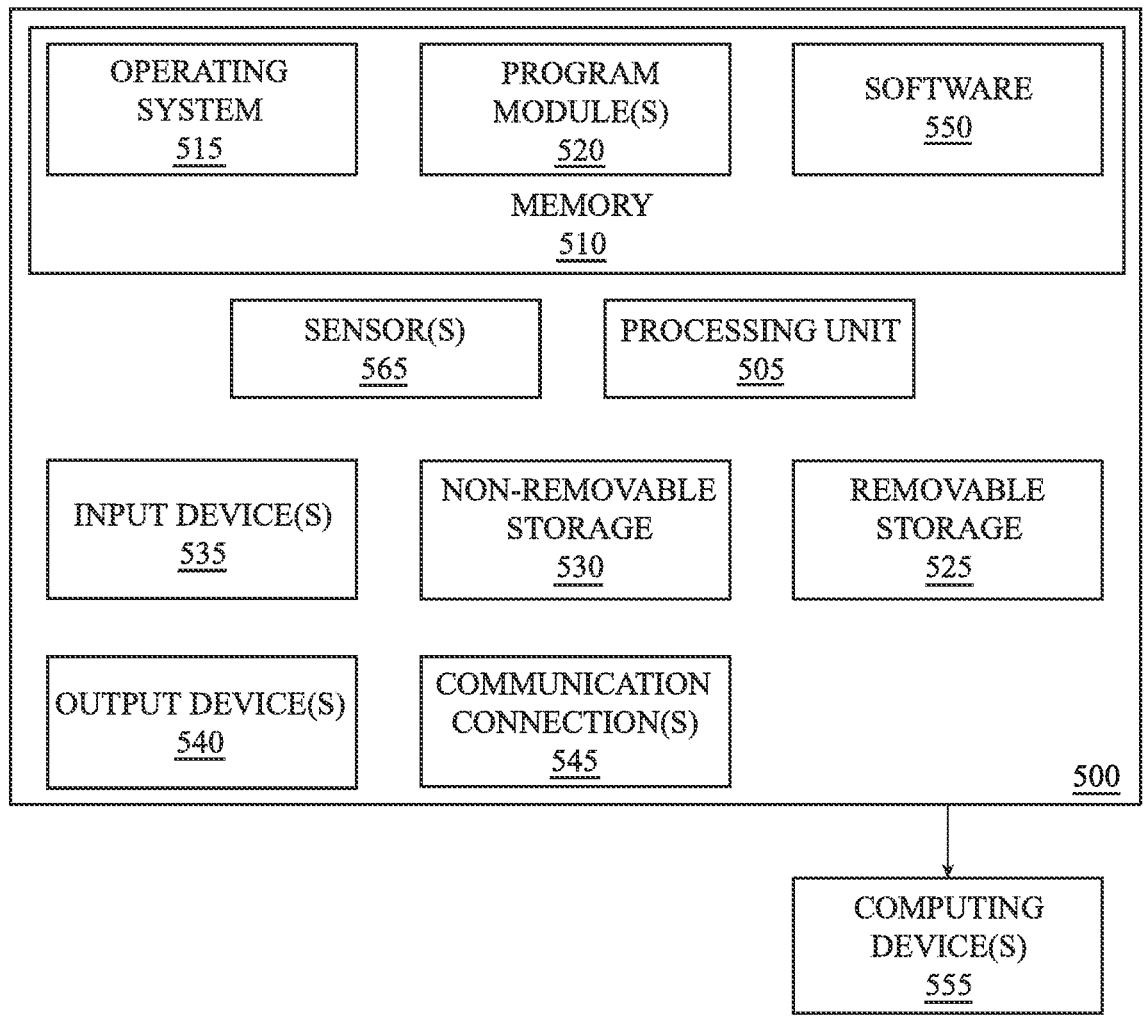
FIG. 5 illustrates example components of a computing device that may be part of the content delivery system.

FIG. 5 illustrates an example computing device 500 that may be part of the content delivery system, such as, for example, content delivery system 100 described with respect to FIGS. 1A-1F. For example, the computing device 500 may be remote device, a server that is part of a content delivery network or any other module described herein. Although various components of the computing device 500 are shown, connections and communication channels between each of the components are omitted for simplicity.

In a basic configuration, the computing device 500 may include at least one controller or processing unit 505 and an associated memory 510. The memory 510 may include, but is not limited to, volatile storage such as random access memory, non-volatile storage such as read-only memory, flash memory, or any combination thereof. The memory 510 may store an operating system 515 and one or more program modules 520 suitable for running software applications 550.

The operating system 515 may be configured to control the computing device 500 and/or one or more software applications 550 being executed by the operating system 515. The program modules 520 or software applications 550 may include modules and programs for requesting information from remote devices, analyzing and comparing received data against known subscriber information, automatically updating access control lists, determining which remote devices have access to particular content and so on.

The computing device 500 may have additional features or functionality than those expressly described herein. For example, the computing device 500 may also include additional data storage devices, removable and non-removable, such as, for example, magnetic disks, optical disks, or tape. These storage devices are illustrated in FIG. 5 by removable storage 525 and a non-removable storage 530.

In certain embodiments, various program modules and data files may be stored in the memory 510. The program modules 520 and the processing unit 505 may perform processes that include one or more of the operations of method 300 and method 400 shown and described with respect to FIGS. 3-4.

The computing device 500 may include one or more input devices 535. The input devices 535 may include a keyboard, a mouse, a pen or stylus, a sound input device, a touch input device, and the like. The computing device 500 may also include one or more output devices 540. The output devices 540 may include a display, one or more speakers, a printer, and the like.

The computing device 500 also includes communication connections 545 that facilitate communications with additional computing devices 555. Such communication connections 545 may include internet capabilities, a RF transmitter, a receiver, and/or transceiver circuitry, universal serial bus (USB) communications, parallel ports and/or serial ports.

As used herein, the term computer readable media may include computer storage media. Computer storage media may include volatile and nonvolatile media and/or removable and non-removable media for the storage of information. Examples include computer-readable instructions, data structures, and program modules. The memory 510, the removable storage 525, and the non-removable storage 530 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for delivering content to a remote device, comprising:
    receiving, over a first communication path of an open Ethernet network, information corresponding to the remote device, the first communication path connected to the remote device via the open Ethernet network;
    comparing the received information to a set of known subscriber information;
    upon determining that the received information does not correspond to at least one of the set of known subscriber information:
        determining whether the received information should be added to the set of known subscriber information; and
        upon determining that the received information should be added to the set of known subscriber information, automatically updating the set of known subscriber information with the received information; and
    upon determining that the received information corresponds to the at least one of the set of known subscriber information, delivering the content to the remote device over a second communication path of a closed network using a gateway that stores an access control list and uses the access control list to determine whether to deliver the content in response to a request received from the remote device over the second communication path, the second communication path connecting the gateway and the remote device via the closed network, the remote device being operable to communicate via the open Ethernet network regardless whether the received information corresponds to the at least one of the set of known subscriber information and unable to communicate with the gateway via the closed network until the received information corresponds to the at least one of the set of known subscriber information.

2. The method of claim 1, further comprising blocking information received from the remote device when it is determined that the received information should not be added to the set of known subscriber information.

3. The method of claim 1, wherein the set of known subscriber information comprises one or more internet protocol addresses.

4. The method of claim 1, wherein the second communication path comprises a firewall.

5. The method of claim 1, wherein the gateway comprises a router.

6. The method of claim 1, wherein the remote device is a set-top box.

7. The method of claim 1, wherein automatically updating the set of known subscriber information with the received information comprises automatically updating a range of internet protocol addresses associated with the received information.

8. The method of claim 1, further comprising removing the received information from the set of known subscriber information when it is determined that the remote device should not have access to the content.

9. A system for providing content, comprising:
    a provisioning module configured to:

receive information from a remote device over a first communication channel of an open Ethernet network, the first communication channel connecting the provisioning module and the remote device via the open Ethernet network;

determine whether to add the received information to an access control list associated with protected content; and automatically add the received information to the access control list; and a gateway configured to utilize the access control list stored by the gateway to permit the remote device to access the protected content over a second communication channel of a closed network in response to a request received from the remote device over the second communication channel after the received information is included in the access control list, the second communication channel connecting the gateway and the remote device via the closed network; wherein the remote device is:

operable to communicate via the open Ethernet network regardless whether the received information is included in the access control list; and unable to communicate with the gateway via the closed network before the received information is included in the access control list.

10. The system of claim 9, wherein the gateway is a firewall.

11. The system of claim 10, wherein the provisioning module communicates an updated access control list to the firewall.

12. The system of claim 9, wherein the provisioning module is further configured to automatically remove the received information from the access control list.

13. The system of claim 9, further comprising a subscriber management system configured to update a subscriber list associated with the access control list.

14. The system of claim 9, wherein the gateway restricts access to at least one of a content delivery network and a digital rights manager.

15. A non-transitory computer-readable storage medium encoding computer executable instructions which, when executed by a processor, performs a method for automatically updating an access control list associated with a content delivery network, comprising:

receiving, over a first communication channel of an open Ethernet network, information from a remote device, the first communication channel connected to the remote device via the open Ethernet network;

upon determining that the information corresponds to a set of known subscriber information, automatically updating the access control list with the information; and providing content to the remote device over a second communication channel of a closed network using a router that stores the access control list and uses the access control list to determine whether to provide the content in response to a request received from the remote device over the second communication channel, the second communication channel connecting the router and the remote device via the closed network, the remote device being operable to communicate via the open Ethernet network regardless whether the information is included in the access control list and unable to communicate via the closed network before the information is included in the access control list.

16. The non-transitory computer-readable storage medium of claim 15, further comprising instructions for providing the updated access control list to the router.

17. The non-transitory computer-readable storage medium of claim 15, further comprising instructions for determining whether the remote device maintains access to the content over the second communication channel.

18. The non-transitory computer-readable storage medium of claim 17, further comprising instructions for removing the information from the updated access control list when it is determined the remote device should not maintain access to the content over the second communication channel.

19. The non-transitory computer-readable storage medium of claim 15, wherein the information is one or more of a subscriber identification number, a block of internet protocol addresses, and a media access control address.

20. The non-transitory computer-readable storage medium of claim 15, wherein the first communication channel is an open communication channel and the second communication channel is a restricted communication channel.

* * * * *